(12) United States Patent
Allen

(10) Patent No.: US 7,779,710 B2
(45) Date of Patent: Aug. 24, 2010

(54) CABLE COVER FOR AN ULTRASONIC FLOW METER

(75) Inventor: Charles Robert Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 232 days.

(21) Appl. No.: 11/763,783

(22) Filed: Jun. 15, 2007

(65) Prior Publication Data

US 2008/0307911 A1 Dec. 18, 2008

(51) Int. Cl.
*G01D 21/00* (2006.01)

(52) U.S. Cl. .................................... 73/866.5

(58) Field of Classification Search ............. None
See application file for complete search history.

(56) References Cited

U.S. PATENT DOCUMENTS

| 3,945,250 | A | 3/1976 | Elazar et al. | |
|---|---|---|---|---|
| 6,789,432 | B2 | 9/2004 | Guazzoni et al. | |
| 6,895,824 | B2 | 5/2005 | Ehrlich et al. | |
| 6,904,811 | B2 | 6/2005 | Ehrlich et al. | |
| 2003/0084732 | A1* | 5/2003 | Ehrlich et al. | 73/861.27 |
| 2007/0227264 | A1* | 10/2007 | Pors et al. | 73/861.28 |
| 2008/0053255 | A1* | 3/2008 | Furey et al. | 73/866.5 |

FOREIGN PATENT DOCUMENTS

| JP | 60148926 | 10/1985 |
|---|---|---|
| JP | 5107091 | 4/1993 |

OTHER PUBLICATIONS

PCT/US2008/066324 International Search Report, Dec. 18, 2008.

* cited by examiner

*Primary Examiner*—Robert R Raevis
(74) *Attorney, Agent, or Firm*—Conley Rose, P.C.

(57) ABSTRACT

A cable cover for an ultrasonic flow meter is disclosed. In some embodiments, the cable cover includes multiple interlockable pieces configured to couple to a spoolpiece of an ultrasonic flow meter. Each interlockable piece includes a body having a dowel and a slot. The interlockable pieces are assembled in a series with the dowel of each interlockable piece inserted into the slot of another interlockable piece.

16 Claims, 9 Drawing Sheets

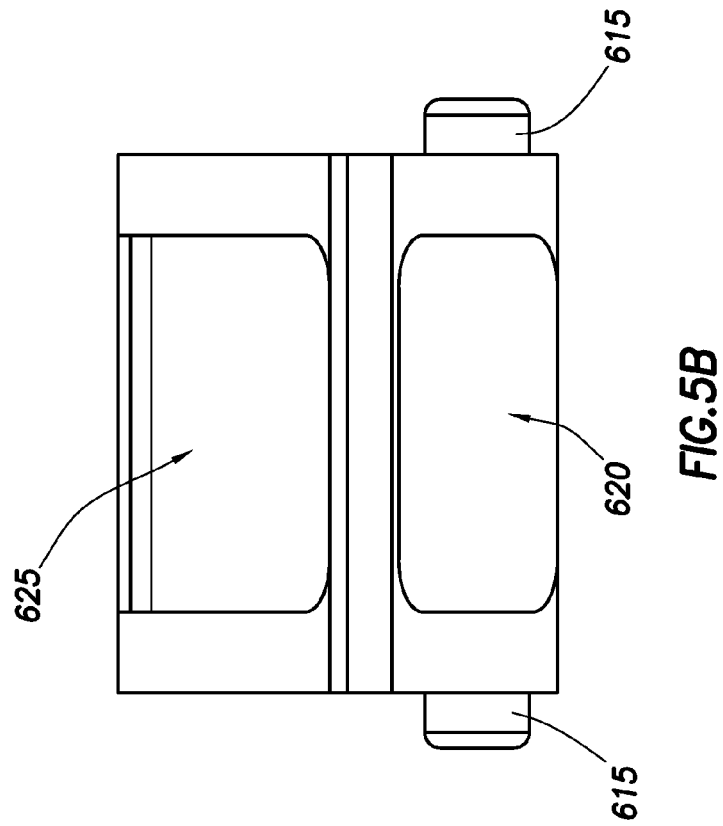
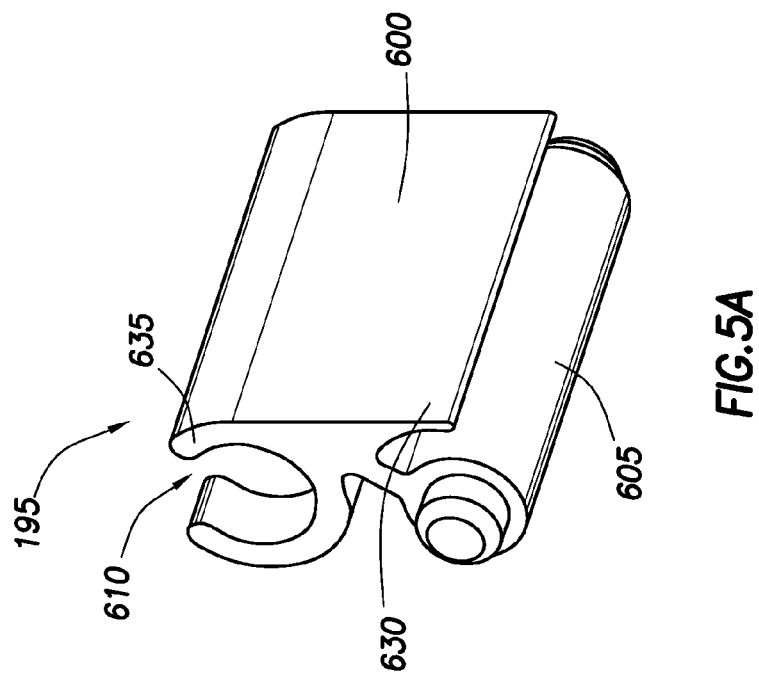
FIG.5B
FIG.5A

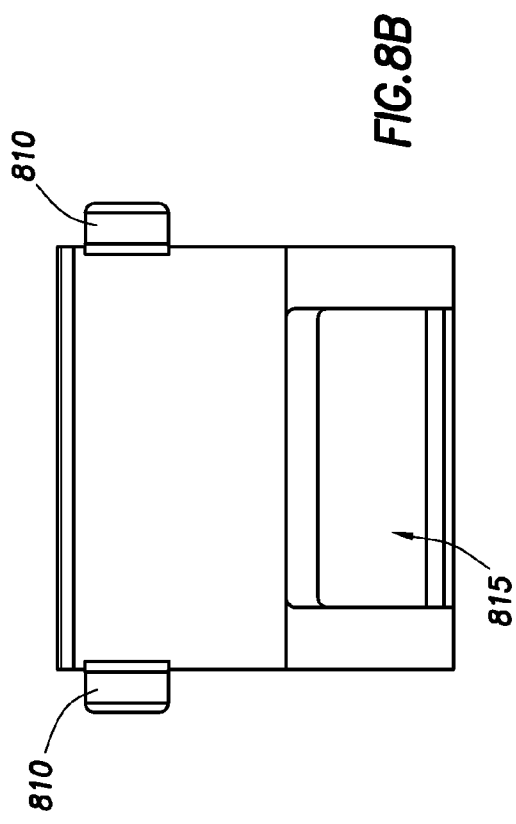
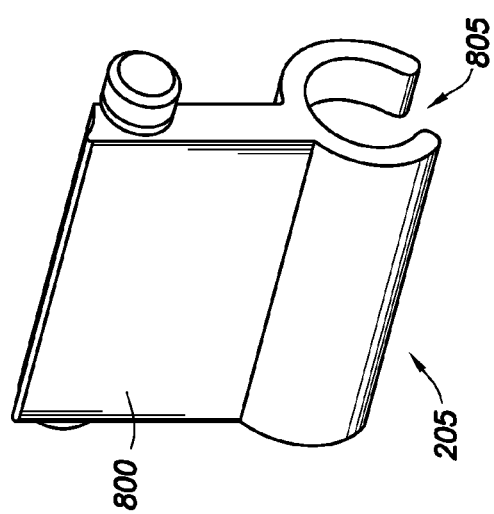
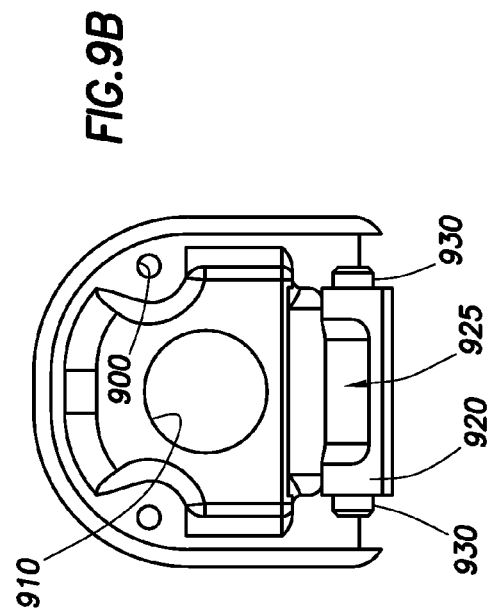
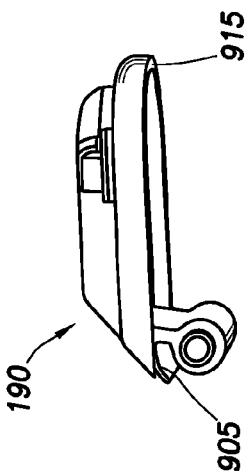
FIG.8A
FIG.8B
FIG.9A
FIG.9B

CABLE COVER FOR AN ULTRASONIC FLOW METER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Art

The various embodiments relate to ultrasonic flow meters. More particularly, the various embodiments relate to a novel method and apparatus for protecting cables extending from transducers in ultrasonic flow meters.

2. Description of the Related Art

After hydrocarbons have been removed from the ground, the fluid stream (such as crude or natural gas) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable.

Ultrasonic flow meters may be used in situations such as custody transfer. In an ultrasonic flow meter, ultrasonic signals are sent back and forth across the fluid stream to be measured. Data indicating various characteristics of the ultrasonic signals is transmitted by cables from transducers positioned within the body, or spoolpiece, of the ultrasonic flow meter to a location where a fluid flow may be calculated. Typically the cables extend from the transducers and run along the outer surface of the spoolpiece to an electronics base enclosure, or similar device. Because the cables run along the outer surface of the ultrasonic flow meters, they are exposed to the surrounding environment and may become damaged due to the weather and/or other sources, e.g. livestock eating the cables.

SUMMARY

The problems noted above are addressed, at least in part, by a cable cover for an ultrasonic flow meter. In some embodiments, the cable cover includes multiple interlockable pieces configured to couple to a spoolpiece of an ultrasonic flow meter. Each interlockable piece includes a body having a dowel and a slot. The interlockable pieces are assembled in a series with the dowel of each interlockable piece inserted into the slot of another interlockable piece.

Some system embodiments include a spoolpiece having an internal flow path, a transducer boss coupled to the spoolpiece, and a flexible cover. The transducer boss includes a face, an aperture, a first side wall, a second side wall, and a pocket. The face includes an outer surface of the spoolpiece. The aperture is located in the face. The first side wall is coupled to the face and has a first groove. The second side wall is coupled to the face and has a second groove. The pocket is bounded by the face, the first side wall, and the second side wall. The flexible cover that engages the first groove and the second groove to form a barrier enclosing an internal volume over the aperture.

Some method embodiments include inserting an end of a cable cover into a first groove located on a spoolpiece of an ultrasonic flow meter, sliding the cable cover along the first groove, and enclosing cables connected to a transducer for carrying signals to and from the transducer.

BRIEF DESCRIPTION OF THE DRAWINGS

For a more detailed description of the various embodiments, reference will now be made to the accompanying drawings, wherein:

FIGS. 5A and 5B illustrate a cover piece of the cable cover of FIG. 2;

FIGS. 8A and 8B illustrate a second extension piece of the cable cover of FIG. 2;

FIGS. 9A and 9B illustrate the bottom cap of the cable cover of FIG. 2; and

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

Figure 1:
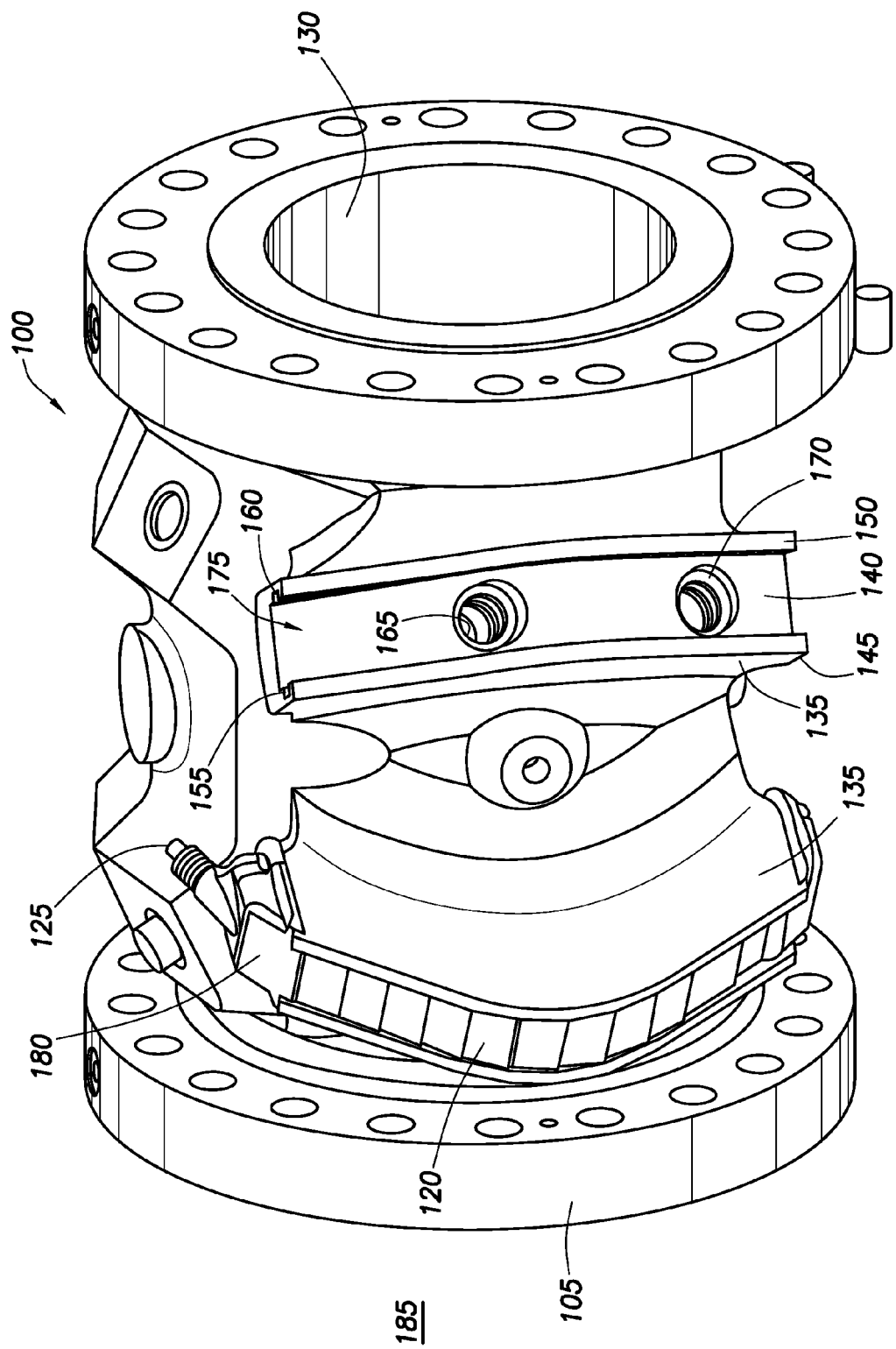
FIG. 1 is perspective view of an ultrasonic flow meter with a cable cover in accordance with at least some embodiments.
Figure 2:
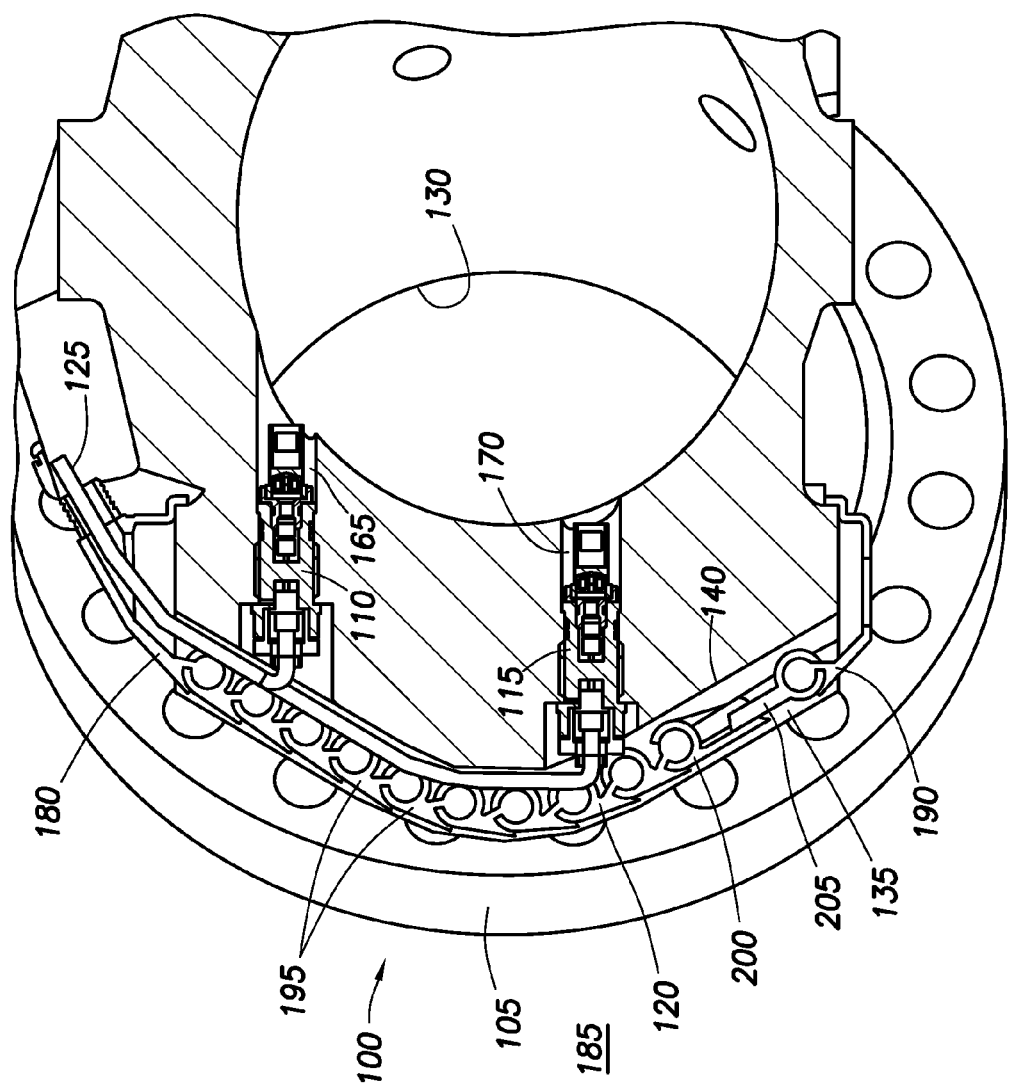
FIG. 2 is a cross-sectional view of the ultrasonic flow meter of FIG. 1, illustrating the position of the cable cover relative to two transducers housed in the meter spoolpiece.

FIGS. 1 and 2 are perspective and cross-sectional views, respectively, of an ultrasonic flow meter with a cable cover in accordance with various embodiments. Ultrasonic flow meter 100 includes spoolpiece 105, two transducers 110, 115, cable cover 120, and cables 125. Spoolpiece 105 is the housing for ultrasonic flow meter 100 and configured for placement between sections of a pipeline. Spoolpiece 105 further includes bore 130 therethrough and two transducer bosses 135 located along its circumference. A fluid may flow through bore 130. Although two transducer bosses 135 are shown, spoolpiece 105 may include as few as one or more than two transducer bosses 135.

Each transducer boss 135 further includes recessed face 140, sides 145, 150, side grooves 155, 160, and transducer ports 165, 170. Face 140 and sides 145, 150 form pocket 175 therebetween. Side groove 155 extends along the surface of side 145 bordering pocket 175. Similarly, side groove 160 extends along the surface of side 150 bordering pocket 175. Transducer ports 165, 170 may each house a single transducer. As best seen in FIG. 2, transducer ports 165, 170 of transducer boss 135 house transducers 110, 115. For each transducer 100, 115, cables used to carry signals between the transducer and a remote location (e.g. an electronics base enclosure) are coupled to the transducer. The cables for both transducers 110, 115, collectively referred to as cables 125, extend from transducers 110, 115 and run along the outer surface of spoolpiece 105 enclosed within pocket 175 of transducer boss 135.

In some embodiments, spoolpiece 105 is a casting into which transducer bosses 135 are machined. Pocket 175 of transducer boss 135 is also created by the machining process to desired dimensions. The width of face 140 of pocket 175 is greater than the diameter of transducer ports 165, 170. The depth of pocket 175 is sufficient to allow side grooves 155, 160, to be machined into sides 145, 150 of transducer boss 135 as well as pocket 175 itself. In some embodiments, side grooves 155, 160 are three-sided grooves with square corners. In other embodiments, side grooves 155, 160 may be half-dovetail grooves with only two sides, where the first side is parallel to face 140 of transducer boss 135 and the second side is oriented at angle less than 90 degrees from the first side. Moreover, in embodiments where side grooves 155, 160 are half-dovetail grooves, the angle of sides 145, 150 with respect to face 140 may be less than or greater than 90 degrees.

To protect cables 125, cable cover 120 is inserted into side grooves 155, 160 of transducer boss 135 and extends the full length of transducer boss 135. Cable cover 120 further includes cover cap 180. Cables 125 extend through cover cap 180 to an electronics base enclosure. When fully installed, cable cover 120 isolates transducer ports 165, 170, transducers 110, 115, and cables 125 from the surrounding environment 185. As illustrated in FIGS. 1 and 2, cable cover 120 is a flexible protective barrier between cables 125 and the surrounding environment 185. In some embodiments, cable cover 120 may be a flat plate, formed, stamped or extruded sheet metal part. In other embodiments, cable cover 120 may be a molded or extruded plastic or metal part. For example, cable cover 120 may be a corrugated sheet of plastic or metal.

In some embodiments, including those exemplified by FIGS. 1 and 2, cable cover 120 is modular, further comprising multiple individual pieces assembled end-to-end. Referring to FIG. 2, cable cover 120 further includes cover cap 180, bottom cap 190, multiple cover pieces 195, first extension piece 200, and second extension piece 205. These pieces 180, 190, 195, 200, 205 are assembled end-to-end, thereby forming cable cover 120. The modularity of cable cover 120 allows for the assembly of varying numbers of individual pieces to form cable covers with variable lengths to accommodate a wide range of different sized ultrasonic flow meters 100 without the necessity to manufacture cable covers for each specific size of ultrasonic flow meters 100. Moreover, the modularity of cable cover 120 permits convenient storage of individual pieces from which the cable cover 120 may be assembled, rather than cable covers having a wide range of sizes.

Figure 3:
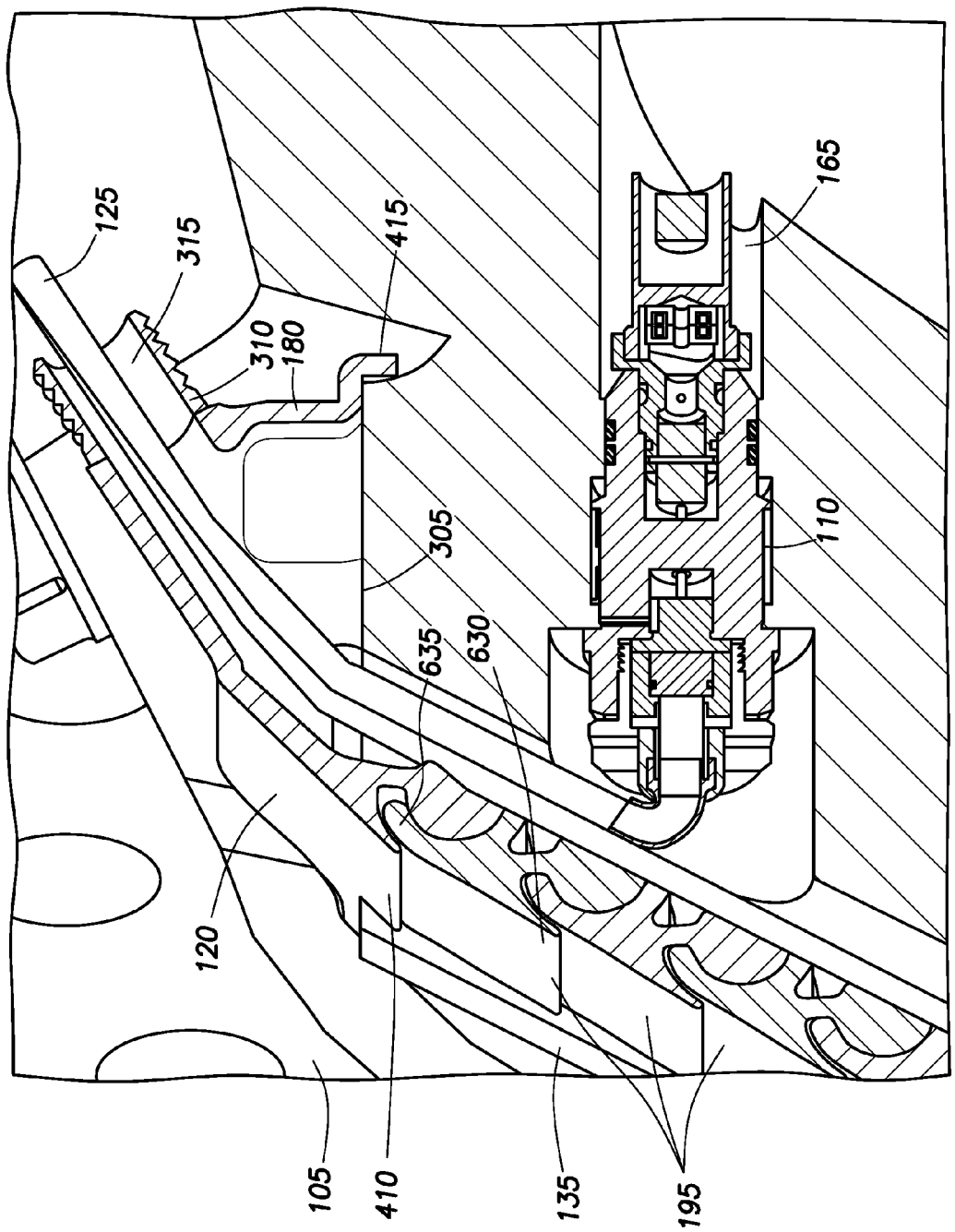
FIG. 3 is an enlarged view of the cover cap of the cable cover of FIG. 2.

FIG. 3 is an enlarged cross-section of cover cap 180. As illustrated, cover cap 180 is coupled to a first cover piece 195, which, in turn, is coupled to a second cover piece 195, and so on. Cover cap 180 may be aluminum, investment cast stainless steel, molded plastic, or other suitable material. In some embodiments, the cover caps 180 have the same design, but in alternate embodiments, the cover caps 180 may be designed differently to accommodate different transducer bosses. Although not visible in this figure, a gasket is positioned between cover cap 180 and the top 305 of transducer boss 135 to provide a weather seal between these two components. Cover cap 180 further includes boss 310 with passage 315 therethrough. Passage 315 of boss 310 provides a passageway through which cables 125 extend from cable cover 120 to an electronics base enclosure. In some embodiments, the outer surface of boss 310 may be threaded. In other embodiments, the outer surface of boss 310 may be machined, molded, or formed to have concentric ribs or notches to receive a rubber or plastic hose or tubing. In still other embodiments, boss 310 may not be threaded or have ribs or notches. Instead, passage 315 may be threaded.

Figure 4B:
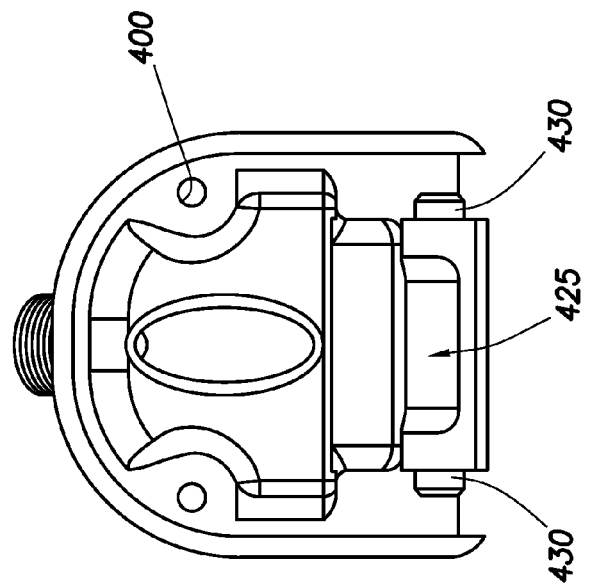
FIGS. 4A and 4B illustrate the cover cap of the cable cover of FIG. 2.
Figure 4A:
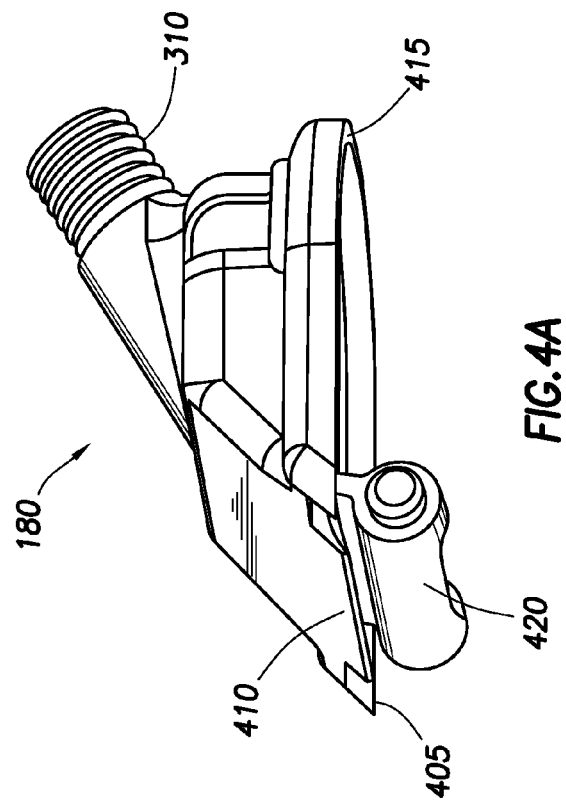

Turning now to FIGS. 4A and 4B, cover cap 180 further includes holes 400, cover seal groove 405, extension 410, lip 415, dowel 420, and cut-out 425. Holes 400 each receive an attachment screw to engage threaded holes located on the top 305 of transducer boss 135. Cover seal groove 405 aligns with side grooves 155, 160 of transducer boss 135 to couple cover cap 180 to transducer boss 135. Extension 410 shields the coupled joint formed by cover piece 195 and cover cap 180. When cover cap 180 is installed with extension 410 pointed downward, as shown in FIG. 3, extension 410 prevents ingress of fluid, such as water, from the surrounding environment 185 through cable cover 120 at the coupled joint of cover piece 195 and cover cap 180, thereby keeping cables 125, pocket 175, and transducer 110 dry. Lip 415, also visible in FIG. 3, extends over the edges of the top 305 of transducer boss 135 to ensure sealing of cable cover 120 from the surrounding environment 185. Dowel 420 further includes two ends 430, each located at opposite ends of dowel 420. To install cover cap 180 of cable cover 120 on transducer boss 135, ends 430 of dowel 420 slide into side grooves 155, 160 of transducer boss 135. When cover cap 180 of cable cover 120 is installed on transducer boss 135, cut-out 425 on dowel 420 provides space for cables 125 to pass under cable cover 120 between cable cover 120 and face 140 of transducer boss 135.

Depending on the size of ultrasonic flow meter 100, cable cover 120 includes multiple cover pieces 195 coupled end-to-end. Like cover cap 180, cover pieces 195 may be aluminum, investment cast stainless steel, molded plastic, or other suitable material. In some embodiments, cover pieces 195 have the same design, and edges of cover pieces 195 which engage side grooves 155, 160 and sides 145, 150 of transducer boss 135 are coated with a rubber seal to provide additional sealing between cable cover 120 and transducer boss 135.

Referring to FIGS. 5A and 5B, each cover piece 195 includes body 600, with dowel 605 and extension 630 at one end and slot 610 and extension 635 at the other end. To couple first cover piece 195 to cover cap 180 (FIG. 3), dowel 420 of cover cap 180 is inserted into slot 610 of cover piece 195. Dowel 605 further includes two ends 615, each located at opposite ends of dowel 605. To couple first cover piece 195 of cable cover 120 to transducer boss 135, ends 615 of dowel 605 slide into side grooves 155, 160 of transducer boss 135. Dowel 605 and slot 610 further include cut-outs 620, 625, respectively. When cable cover 120 is installed on transducer boss 135, cut-outs 620, 625 provide space for cables 125 to pass under cable cover 120 between face 140 of transducer boss 135 and cable cover 120.

Moreover, when cable cover 120 is installed on transducer boss 135 with extension 630 pointed downward and extension 635 pointed upward, as shown in FIGS. 5A and 5B, extension 630 shields the coupled joint of cover piece 195 and the adjacent cover piece 195, or extension piece 200, located below. Similarly, extension 635 shields the coupled joint of cover piece 195 and the adjacent cover piece 195, or cover cap 180, located above. Extension 630 and extension 635 prevent ingress of fluid, such as water, from the surrounding environment 185 through cable cover 120 at these coupled joints, thereby keeping cables 125, pocket 175, and transducer 110 dry.

Additional cover pieces 195 may be joined end-to-end to lengthen cable cover 120 as needed. To couple a second cover piece 195 to first cover piece 195, dowel 605 of first cover piece 195 is inserted into slot 610 of second cover piece 195. To couple a third cover piece 195 to second cover piece 195, dowel 605 of second cover piece 195 is inserted into slot 610 of third cover piece 195, and so on until cable cover 120 reaches the desired length. To couple the additional cover pieces 195 to transducer boss 135, ends 615 of dowel 605 of the additional cover pieces 195 slide into side grooves 155, 160 of transducer boss 135. When cable cover 120 is installed on transducer boss 135, cut-outs 620, 625 of the additional cover pieces 195 provide space for cables 125 to pass under cable cover 120 between face 140 of transducer boss 135 and cable cover 120.

Figure 6:
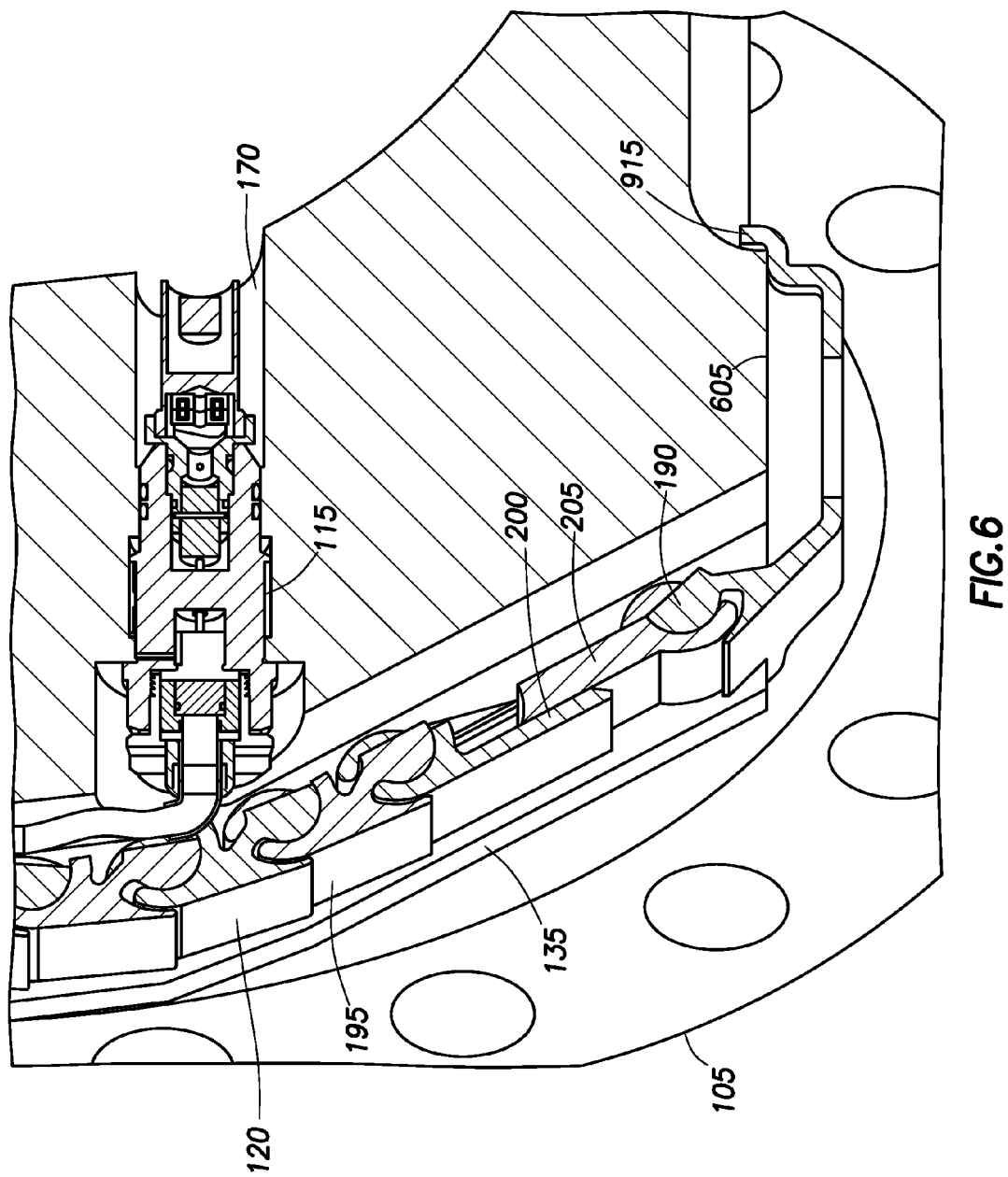
FIG. 6 is an enlarged view of the bottom cap of the cable cover of FIG. 2.

FIG. 6 is an enlarged cross-section of bottom cap 190. As illustrated, two extension pieces 200, 205 couple the lower most cover piece 195 with bottom cap 190 to complete cable cover 120. Like cover cap 180 and cover pieces 195, extension pieces 200, 205 and bottom cap 190 may be aluminum, investment cast stainless steel, molded plastic, or other suitable material. In some embodiments, first extension pieces 200 have the same design. The same may be said for second extension pieces 205 and bottom caps 190, respectively.

Figure 7B:
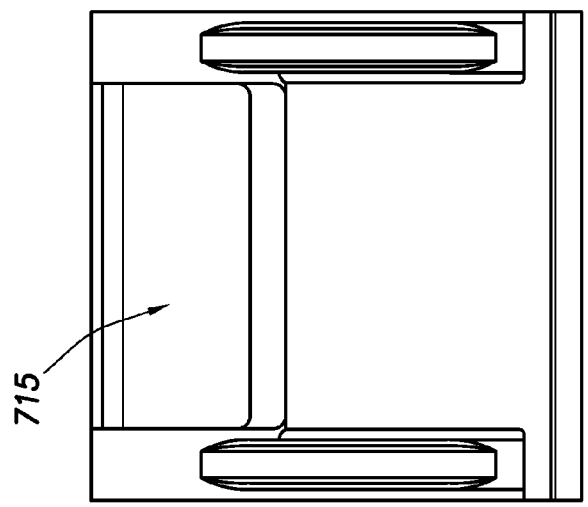
FIGS. 7A and 7B illustrate a first extension piece of the cable cover of FIG. 2.
Figure 7A:
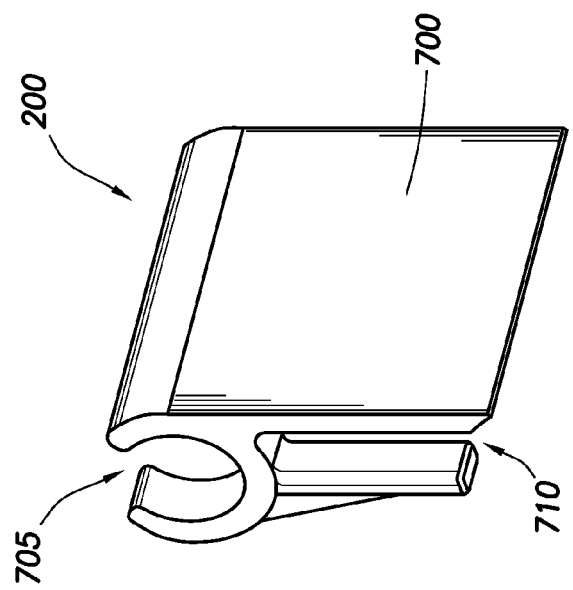

First extension piece 200 couples to the lower most cover piece 195, while second extension piece 205 couples bottom cap 190 to first extension piece 200. The coupling of first and second piece 200, 205 has an adjustable length, which may be shortened, if needed, to ensure cable cover 120 snugly encloses cables 125 within pocket 175 of transducer boss 135. Referring to FIGS. 7A and 7B, first extension piece 200 further includes body 700 with slots 705, 710 located at opposite ends. Slot 705 couples first extension piece 200 to the lowermost cover piece 195. Specifically, slot 705 of first extension piece 200 couples to dowel 605 of the lowermost cover piece 195. First extension piece 200 further includes cut-out 715. When first extension piece 200 is installed over transducer boss 135, cut-out 715 provides space, if needed, for cables 125 to pass under cable cover 120 between face 140 of transducer boss 135 and cable cover 120.

FIGS. 8A and 8B schematically depict second extension piece 205, which further includes a body 800 having slot 805 at one end and two ends 810 at the other. To couple second extension piece 205 to first extension piece 200, ends 810 slide into slot 710 of first extension piece 200. Slot 805 couples bottom cap 190 to second extension piece 200, as will be described in the following paragraph. Second extension piece 205 further includes cut-out 815. When second extension piece 205 is installed over transducer boss 135, cut-out 815 provides space, if needed, for cables 125 to pass under cable cover 120 between face 140 of transducer boss 135 and cable cover 120.

Finally, FIGS. 9A and 9B schematically depict bottom cap 190, which further includes holes 900, cover seal groove 905, drain hole 910, lip 915, dowel 920, and cut-out 925. Holes 900 each receive an attachment screw to engage threaded holes on the bottom 605 of transducer boss 135. Cover seal groove 905 aligns with side grooves 155, 160 of transducer boss 135 to couple bottom cap 190 to transducer boss 135. Drain hole 910 provides an opening at the lowermost end of cable cover 120 to allow rainwater, or other moisture, to drain from the enclosure formed by cable cover 120 and pocket 175 of transducer boss 135 so that moisture does not collect within the enclosure and potentially damage cables 125. To prevent bugs and/or debris from collecting inside cable cover 120 and also potentially damaging cables 125, a screen may be coupled to bottom cap 190 over drain hole 910. Lip 915, also visible in FIG. 6, extends over the edges of the bottom 605 of transducer boss 135 to ensure sealing of cable cover 120 at this location from the surrounding environment 185. Dowel 920 of bottom cap 190 inserts into slot 805 of second extension piece 205 to couple these two components. Dowel 920 further includes two ends 930, each located at opposite ends of dowel 920. To install bottom cap 190 of cable cover 120 on transducer boss 135, ends 930 of dowel 920 slide into side grooves 155, 160 of transducer boss 135. When bottom cap 190 of cable cover 120 is installed on transducer boss 135, cut-out 925 on dowel 920 provides space, if needed, for cables 125 to pass under cable cover 120 between cable cover 120 and face 140 of transducer boss 135.

Cable cover 120 permits protection of cables 125 from damage caused by the surrounding environment and from mechanisms, such as radio frequency interference, which degrade the quality of signals carried by cables 125, without the need to use more robust cables and/or cable shields. Moreover, the design of cable cover 120 facilitates easy access to transducers 110, 115 housed within ultrasonic flow meter 100 for maintenance and replacement, particularly at pipeline facilities where conditions (lightning, weather, and the like) are less than ideal.

Figure 10:
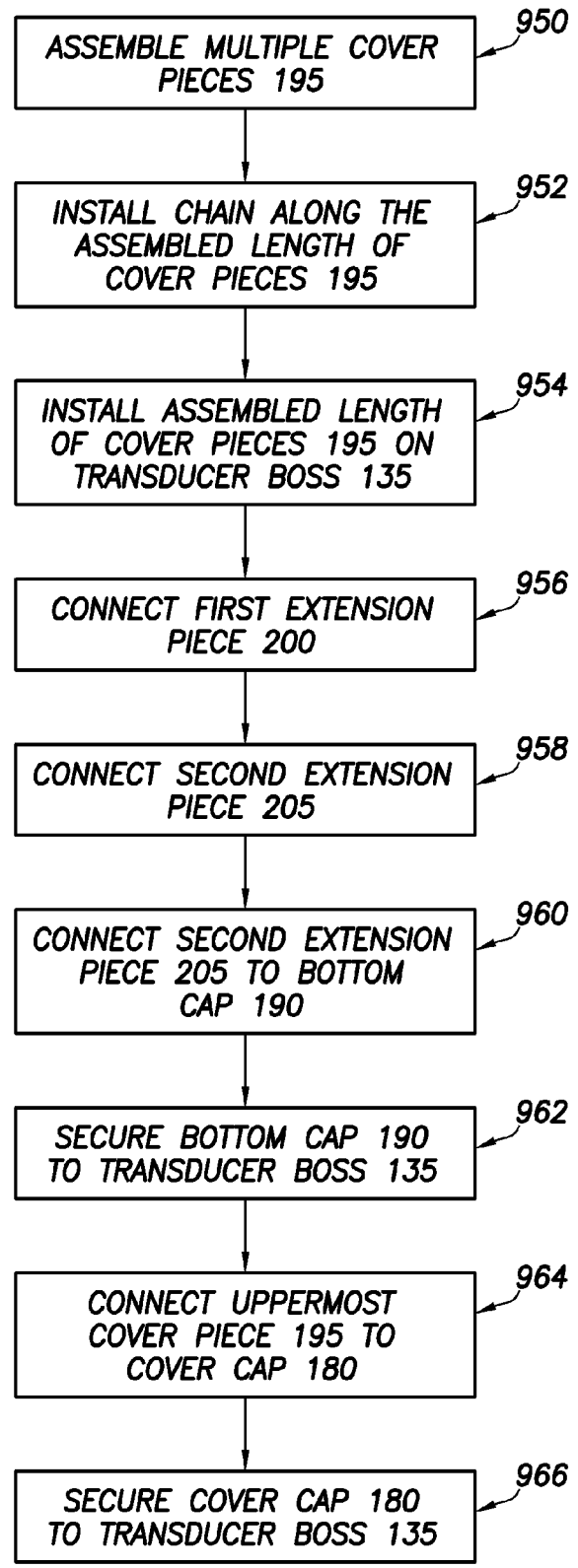
FIG. 10 illustrates various representative method embodiments for installing the cable cover on the ultrasonic flow meter of FIG. 1.

Referring to FIG. 10, various method embodiments for installing of cable cover 120 are illustrated. These method embodiments begin when the bulk of cable cover 120 is assembled (block 950). Multiple cover pieces 195 are assembled end-to-end to form a length appropriate for ultrasonic flow meter 100. To couple a second cover piece 195 to a first cover piece 195, as depicted in FIG. 3, dowel 605 of the first cover piece 195 is inserted into slot 610 of the second cover piece 195. To couple a third cover piece 195 to the second cover piece 195, dowel 605 of the second cover piece 195 is inserted into slot 610 of the third cover piece 195, and so on until the assembled length of cover pieces 195 reaches the desired length. In some embodiments, a chain may then be coupled to each cover piece 195 of the assembled length such that once coupled, the assembled length does not come apart, either in transit to the installation site or during maintenance of ultrasonic flow meter 100 at the site (block 952).

Next, cable cover 120 is assembled and installed on transducer boss 135 of ultrasonic flow meter 100. First, the assembled length of multiple cover pieces 195 is installed on transducer boss 135 (block 954). This is accomplished by inserting ends 615 of dowels 605 of cover pieces 195 into side grooves 155, 160 of transducer boss 135 and sliding the assembled length along the full length of transducer boss 135 until the lowermost cover piece 195 is accessible from the lower end of transducer boss 135.

Extension piece 200 is then coupled to the lowermost cover piece 195 by inserting dowel 605 of the lowermost cover piece 195 into slot 705 of first extension piece 200 (block 956). Next, second extension piece 205 is coupled to first extension piece 200 by inserting body 800 of second extension piece 205 into slot 710 of first extension piece 200 (block 958). Bottom cap 190 is then coupled to second extension piece 205 by inserting dowel 920 of bottom cap 190 into slot 805 of second extension piece (block 960).

Once bottom cap 190 is coupled to second extension piece 205, bottom cap 190 is coupled to the bottom 605 and side grooves 155, 160 of transducer boss 135. First, the dowels ends 810 of second extension piece 205 are inserted into and slid along side grooves 155, 160 of transducer boss 135. Second, the dowel ends 930 of bottom cap 190 are inserted into and slid along side grooves 155, 160 of transducer boss 135. Lastly, bottom cap 190 is coupled to the bottom 605 of transducer boss 135 by securing two attachment screws through holes 900 of bottom cap 190 to engage matching threaded holes located on the bottom 605 of transducer boss 135 (block 962).

Cover cap 180 is then coupled to the uppermost cover piece 195 and the top 305 of transducer boss 135. First, the assembled length of cover pieces 195 are raised until the dowel ends 615 of the uppermost cover piece 195 are disengaged from side grooves 155, 160 of transducer boss 135. During the raising of the assembled length of cover pieces 195, slot 710 of first extension piece 200 slides along the length of body 800, and each cover piece dowel end 615 slides along side grooves 155, 160 of transducer boss 135. Second, cover cap 180 is coupled to the uppermost cover piece 195 by inserting dowel 420 of cover cap 180 into slot 610 of the uppermost cover piece 195 (block 964). Lastly, cover cap 180 is coupled to the top 305 of transducer boss 135 by securing two attachment screws through holes 400 of cover cap 180 to engage matching threaded holes located on the top 305 of transducer boss 135 (block 966). In some embodiments, a gasket is inserted between cover cap 180 and the top 305 of transducer boss 135 to provide a seal between these components.

As cover cap 180 is coupled to the top 305 of transducer boss 135, the assembled length of cover pieces 195 is lowered, and the dowel ends 615 of the uppermost cover piece 195 engage side grooves 155, 160 of transducer boss 135. During the lowering of the assembled length of cover pieces 195, slot 710 of first extension piece 200 slides along the length of body 800, and the dowel end 615 of each cover piece 195 slides along side grooves 155, 160, thereby removing any slack in the now completely assembled and installed cable cover 120 and ensuring a snug fit of cable cover 120 over transducer boss 135.

Once installed, cable cover 120 may be easily removed and replaced to permit access to transducers 110, 115 for maintenance and replacement. To remove cable cover 120, the steps illustrated by FIG. 10 may be performed in reverse order with two omissions. Bottom cap 190 need not be disengaged from transducer boss 135 by removing attachment screws from holes 900 of bottom cap 190. Also, second extension piece 205 may remain coupled to bottom cap 190. After maintenance and/or replacement operations are complete, cable cover 120 may be reinstalled on transducer boss 135 following the methodology illustrated by FIG. 10.

While various embodiments of this invention have been shown and described, modifications thereof can be made by one skilled in the art without departing from the spirit or teaching of this invention. The embodiments described herein are exemplary only and are not limiting. Accordingly, the scope of protection is not limited to the embodiments described herein, but is only limited by the claims which follow, the scope of which shall include all equivalents of the subject matter of the claims.

What is claimed is:

1. A system comprising:
   a spoolpiece having an internal flow path and
   a transducer boss, the transducer boss comprising:
      a face, wherein the face comprises an outer surface of the spoolpiece;
      an aperture located in the face;
      a first side wall coupled to the face and having a first groove along its length;
      a second side wall coupled to the face and having a second groove along its length; and
      a pocket bounded by the face, the first side wall, and the second side wall;
   a flexible cover that slideably engages the first groove and the second groove;
   wherein the cover forms a barrier enclosing an internal volume over the aperture.

2. The system of claim 1, further comprising the flexible cover is modular, comprising multiple individual pieces assembled end-to-end.

3. The system of claim 2, wherein the multiple individual pieces comprise one or more of the group consisting of: plastic and metal.

4. The system of claim 1, further comprising:
   a transducer within the aperture; and
   cables coupled to the transducer;
   wherein the cables extend from the transducer along the face inside the internal volume.

5. The system of claim 1, wherein the flexible cover further comprises an opening configured to allow the passage of one or more cables therethrough.

6. The system of claim 1, wherein the flexible cover further comprises a drain hole configured to permit the drainage of moisture from the internal volume.

7. The system of claim 1, wherein the first groove is located along a surface of the first side wall adjacent to the pocket and the second groove is located along a surface of the second side wall adjacent to the pocket.

8. The system of claim 1, wherein the first groove and the second groove are three-sided with square corners.

9. A system comprising:
   a spoolpiece having an external surface, a transducer boss formed thereon, and an internal flow path; and
   a flexible cover coupled to the transducer boss, the cover comprising a plurality of interlockable pieces;
   wherein the cover, the spool piece, and the transducer boss form a barrier enclosing an internal volume.

10. The system of claim 9, wherein the transducer boss includes a pair of grooves, and the flexible cover is slidingly received within the grooves.

11. The system of claim 10, wherein the grooves are three-sided with square corners.

12. The system of claim 9, further comprising:
    an aperture in the spoolpiece extending from the transducer boss into the flow path;
    a transducer disposed within the aperture; and
    one or more cables coupled to the transducer;
    wherein the cables extend from the transducer and are disposed inside the internal volume.

13. The system of claim 12, wherein said transducer boss comprises:
    a face having the aperture therein;
    a first side wall coupled to the face and having a first groove; and
    a second side wall coupled to the face and having a second groove;
    wherein the face, the first side wall, and the second side wall bound a pocket; and
    wherein each interlockable piece of said flexible cover comprises:
    a body;

a dowel disposed on the body, the dowel having two opposing ends, one end inserted within the first groove and the other end inserted within the second groove; and a slot disposed on the body, the slot configured to receive a dowel of an adjacent interlockable piece.

14. The system of claim 12, wherein the flexible cover further comprises an opening configured to allow the passage of the cables therethrough.

15. The system of claim 9, wherein the flexible cover further comprises a drain hole configured to permit the drainage of moisture from the internal volume.

16. A system comprising:

a spoolpiece having an internal flow path;

a pair of upstanding, parallel side walls extending along a surface of the spoolpiece, each side wall having a groove;

an aperture in the spoolpiece formed at a location between the side walls and extending into the flow path; and a flexible cover slidingly engaging the grooves and enclosing an interior volume, the flexible cover having interlocking links.

* * * * *